United States Patent [19]

Kaschmitter et al.

[11] Patent Number: 5,636,437
[45] Date of Patent: Jun. 10, 1997

[54] FABRICATING SOLID CARBON POROUS ELECTRODES FROM POWDERS

[75] Inventors: James L. Kaschmitter, Pleasanton; Tri D. Tran; John H. Feikert, both of Livermore; Steven T. Mayer, San Leandro, all of Calif.

[73] Assignee: Regents of the University of California, Oakland, Calif.

[21] Appl. No.: 440,168

[22] Filed: May 12, 1995

[51] Int. Cl.$^6$ ..................................................... H01R 43/00
[52] U.S. Cl. ........................... 29/825; 429/101; 429/105; 429/194; 264/29.1; 264/29.2; 264/29.3; 502/418; 524/596
[58] Field of Search ............................ 29/825; 429/101, 429/105, 194; 502/418; 524/596; 264/29.1, 29.2, 29.3

[56] References Cited

U.S. PATENT DOCUMENTS

| | | |
|---|---|---|
| 4,296,187 | 10/1981 | Barnes et al. |
| 4,352,866 | 10/1982 | Klinedinst et al. |
| 4,562,094 | 12/1985 | Goebel et al. |
| 4,756,898 | 7/1988 | Hopper et al. |
| 4,832,881 | 5/1989 | Arnold et al. |
| 5,150,283 | 9/1992 | Yoshida et al. |
| 5,158,843 | 10/1992 | Batson et al. |
| 5,260,855 | 11/1993 | Kaschmitter et al. |
| 5,358,802 | 10/1994 | Mayer et al. |
| 5,508,341 | 4/1996 | Mayer et al. |

FOREIGN PATENT DOCUMENTS

| | | |
|---|---|---|
| 55-102279 | 8/1980 | Japan . |
| 56-85874 | 7/1981 | Japan . |
| 58-18970 | 2/1983 | Japan . |
| 59-115567 | 7/1984 | Japan . |
| 62-92482 | 4/1987 | Japan . |
| 62-142367 | 6/1987 | Japan . |
| 4-162510 | 6/1992 | Japan . |

OTHER PUBLICATIONS

UCRL-JC-119661, "Commercial Carbonaceous Materials As Lithium Intercalation Anodes", T.D. Tran et al., bearing date of Jan. 1995.

UCRL-JC-117265 "Carbonaceous Materials As Lithium Intercalation Anodes", T.D. Tran et al., bearing date of Oct. 1994.

UCRL-JC-119221, "Lithium Intercalation In Porous Carbon Anodes", T.D. Tran, bearing date of Nov. 1994.

Primary Examiner—Carl J. Arbes
Attorney, Agent, or Firm—L. E. Carnahan; Henry P. Sartorio

[57] ABSTRACT

Fabrication of conductive solid porous carbon electrodes for use in batteries, double layer capacitors, fuel cells, capacitive dionization, and waste treatment. Electrodes fabricated from low surface area (<50 m$^2$/gm) graphite and cokes exhibit excellent reversible lithium intercalation characteristics, making them ideal for use as anodes in high voltage lithium insertion (lithium-ion) batteries. Electrodes having a higher surface area, fabricated from powdered carbon blacks, such as carbon aerogel powder, carbon aerogel microspheres, activated carbons, etc. yield high conductivity carbon compositives with excellent double layer capacity, and can be used in double layer capacitors, or for capacitive deionization and/or waste treatment of liquid streams. By adding metallic catalysts to be high surface area carbons, fuel cell electrodes can be produced.

14 Claims, 1 Drawing Sheet

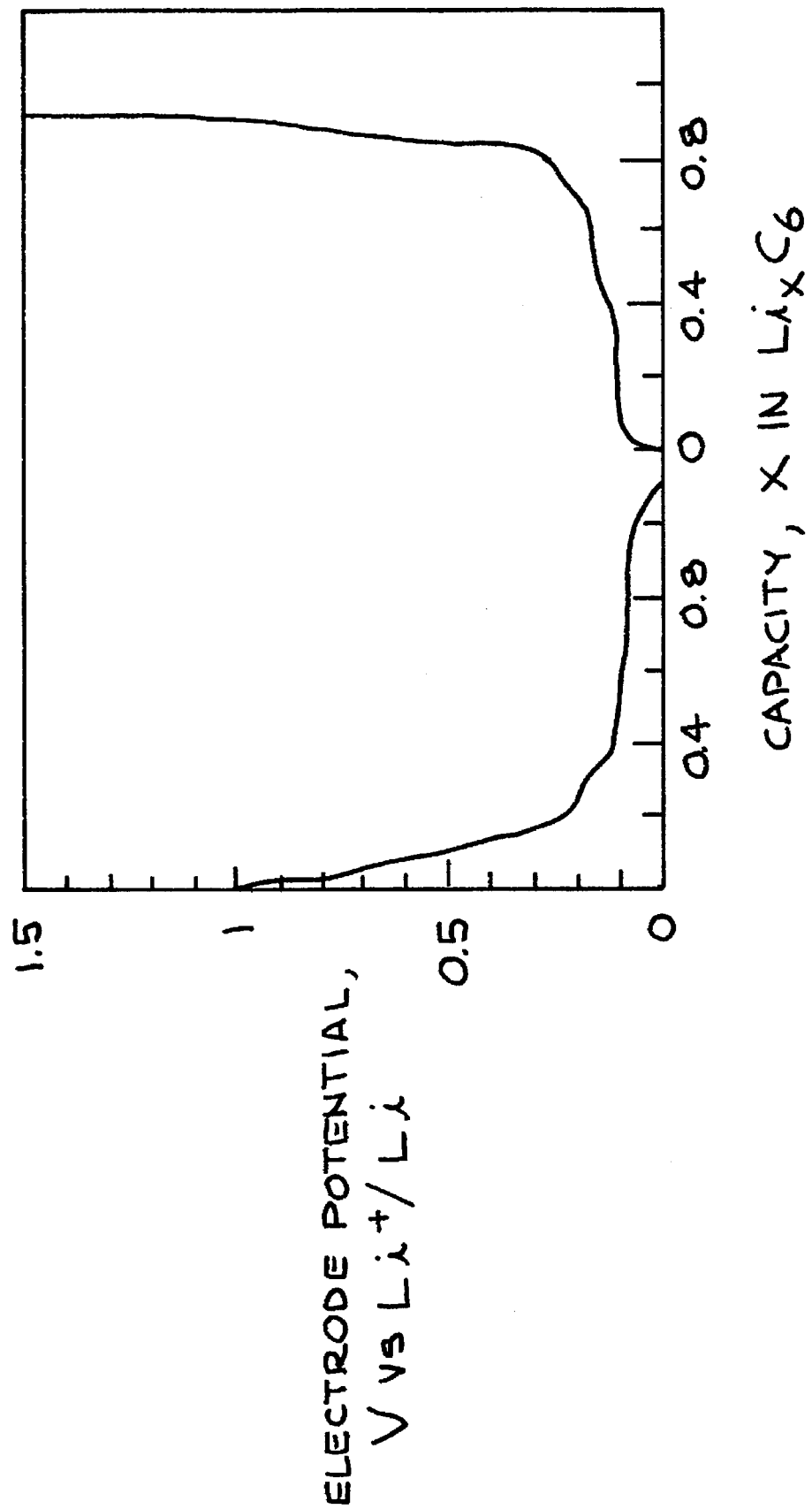

FABRICATING SOLID CARBON POROUS ELECTRODES FROM POWDERS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to electrodes, particularly to carbon electrodes, and more particularly to the fabrication of solid carbon porous electrodes from powders, with the use thereof being determined by the surface area thereof and dopant therein.

Carbon is an attractive candidate for use in various types of electrodes including lithium-intercalation negative electrodes for lithium ion or rechargeable cells because of its low cost, chemical stability, and excellent reversibility for lithium (Li) insertion. Cells containing Li-intercalated carbon electrodes are more easily fabricated than similar cells containing lithium metal because the carbon electrode components are stable in air. A variety of carbonaceous materials (graphite, petroleum coke, carbon black, carbon fiber, glassy carbon, etc.), having a wide spectrum of physical and chemical characteristics, have been evaluated in Li-intercalation electrodes. However, the factors which influence the electrode capacity, irreversible capacity loss, voltage profile and cycle life are not fully understood. The variety of commercial carbonaceous materials with different particle morphologies and structures, varying composition of carbon and other elements, and different surface properties require customized electrode fabrication procedures. These varying techniques and complexed electrode compositions, makes analysis and correlation of the electrochemical results particularly difficult. However, the availability and low cost of these materials make them particularly attractive for electrode fabrication.

During the evaluation efforts that lead to the present invention, both commercial and polymer-derived carbons were evaluated for various electrode applications. The carbons and graphites obtained from commercial sources were divided into to classes (graphitized or non-graphitized) based on the information provided from the manufacturers and/or their pyrolysis temperature (Tp<1350° C. considered non-graphitized). This distinction was made because a different electrolyte was used to evaluate the graphitized and non-graphitized carbon. For further details of these evaluations see paper (UCRL-JC-117265), T. D. Tran et al, "Carbonaceous Materials As Lithium Intercalation Anodes", presented at The 186th Meeting of the Electrochemical Society, Miami Beach, Fla., October 1994, published March 1995.

In addition to the carbons available from commercial sources, several polymer-based carbons were also synthesized and evaluated. The polymer-based carbons were obtained by carbonizing polyacrylonitrile (PAN), manufactured by DuPont, phenolic resin, manufactured by Reichold Chemical, and polyfurfuryl alcohol (QO Chemicals) at 1050° C. for 3 hours in a nitrogen atmosphere. The polyfurfuryl alcohol was obtained from the phosphoric acid-catalyzed polymerization of furfuryl alcohol. These carbonized materials were ground and sieved to between 30–60 μm before testing in an electrode structure.

The influence of a phosphorous additive on the ability of carbon to intercalate Li was also investigated, since many of the carbonaceous materials previously used as lithium intercalation anodes in lithium-ion or rocking-chair rechargeable cells have capacity below the theoretical value of 372 mAh/g which corresponds to 1 mole of lithium per 6 moles of carbon ($LiC_6$). It was found that phosphorous in carbonaceous materials, such as coke, enhances its capacity for Li intercalation. It was found that by doping the above-references polymer-based carbons enhanced the electrode capacity. These evaluation efforts involved the influence of a phosphorus additive on the ability of monolithic polyacrylonitrile-derived porous carbon forms, to intercalate lithium, the results of which are described in a paper UCRL-JC-119221 by T. D. Tran et al, "Lithium Intercalation In Porous Carbon Anodes", 1994 Fall Meeting of the Material Research Society Nov. 28–Dec. 2, 1994.

Prior studies have been conducted on binders for the various types of carbon and graphite, and it has been determined that the choice of binder can have a major influence on the electrochemical performance of carbon for Li intercalation. During the above-referenced evaluation of the polymer-based carbons, binder evaluation was carried out, and the experiments indicated that both the irreversible capacity loss on the first cycle and the reversible capacity for lithium intercalation were dependent on the type of binder used in the carbon electrode. These evaluations are also set forth in T. D. Tran et al, "Carbonaceous Materials As Lithium Intercalation Anodes", referenced above.

From the above-referenced evaluations of various carbonaceous materials it was recognized that a need existed for a method of forming solid porous electrodes from inexpensive materials. That need has been satisfied by the present invention which broadly involves the formation of solid carbon porous electrodes from powders of graphites, pyrolyzed cokes, carbons, polymer-desired carbons, and carbon aerogels. In accordance with the present invention, solid porous electrodes have been produced by combining powders of various carbon blacks, examples of which include pyrolyzed cokes, powders derived from the pyrolysis of polyfurfuryl alcohol, polyacrylonitrile, carbon aerogel microspheres and powders, and various graphite powders.

SUMMARY OF THE INVENTION

It is an object of the present invention to fabricate solid carbon porous electrodes from powders.

A further object of the invention is to enhance the conductivity of solid carbon porous electrodes.

A further object of the invention is to provide a process for fabricating porous carbon electrodes from powders.

Another object of the invention is to enable the fabrication of carbon electrodes so as to control the surface area by the type of carbon powders uses.

Another object of the invention is to enhance the characteristics of carbon electrodes formed from polymer-based powders by adding metallic catalysts thereto.

Other objects and advantages of the present invention will become apparent from the following description. Basically the invention involves the fabrication of conductive solid porous carbon electrodes for use in batteries, double layer capacitors, fuel cells, capacitive deionization, and waste treatment. The composition of the electrode determines its use. Electrodes made from low surface area materials and having excellent reversible lithium intercalation characteristics are ideal for use as anodes in high voltage lithium insertion (lithium-ion) batteries. Use of higher surface area powdered carbon blacks in the formation of the electrodes yield high conductivity carbon composites with excellent double layer capacity for use in double layer (super) capacitors or for capacitive deionization and/or waste treatment of liquid streams. By adding metallic catalysts to the high surface area carbons, fuel cell electrodes can be produced.

The present invention utilizes powders, made into slurries, which offer ease of processing over less conventional approaches in making carbon foams by previous known processes. Foams made using pyrolyzed organic materials (e.g. pyrolyzed polymers and organic liquids) have the advantage over composites known in the art and made using polymer binders such as PTFE (Teflon), PVDF (Kynar), and EPDM because such composites are bound together with the aforementioned non-conducting material and exhibit higher resistivity. In some cases (as with the use of graphite powders), the formation of electrodes using these conventional binders is difficult because of the lubricating nature of the graphite powder (i.e, it is hard to get the binder to "stick" to the powder. The foams produced by the pyrolysis of the powder using polymer or organic based binder precursors, in accordance with the present invention, are mechanically robust, and exhibit high electrical conductivity, thereby improving the efficiency, energy density, and cycle life when used in the aforementioned applications. Adhesion to graphite powders is also relatively facile, since the binding is between carbon particles and a carbon based binder. Also, use of a surface activating agent, such as ethanol or other pyrolyzable (carbonizable) materials in the slurry to facilitate wetting can be conveniently incorporated.

BRIEF DESCRIPTION OF THE DRAWINGS

The accompanying drawing, which is incorporated into and forms a part of the disclosure, illustrates the invention and, together with the description, serves to explain the principles of the invention.

The single FIGURE illustrates discharge/charge profiles of anodes containing Lonza SFG6 carbon powders in 0.5M $LiN(CF_3SO_2)_2/50:50)$ EC:DMC electrolytes; C/24 rate.

DETAILED DESCRIPTION OF THE INVENTION

The present invention involves the fabrication of solid carbon porous electrodes from powders for use in batteries, double layer capacitors (super-capacitors), fuel cells, capacitive ionization and waste treatment, for example. The specific application for which the electrode is intended determines the desired surface area and thus the composition of the powders utilized. Electrodes made from low surface area (<50 $m^2/gm$) carbon containing materials, such as graphite and cokes exhibit excellent reversible lithium intercalation characteristics, making them ideal for use as anodes in high voltage lithium insertion (lithium-ion) batteries. Electrodes made from higher surface area powdered carbon blacks, such as carbon aerogel powder, carbon aerogel microspheres, activated carbons, etc., yield high conductive carbon compositives with excellent double layer capacity. These electrodes can be used in double layer capacitors, or for capacitive deionization and/or waste treatment of liquid streams. By adding metallic catalysts (dopants) to the high surface area carbons, fuel cell and other energy conversion device electrodes can be produced. In addition, the carbons can be pyrolyzed in an inert atmosphere (e.g. argon, nitrogen, vacuum), a reducing atmosphere (e.g. hydrogen containing gas mixture), or an oxidizing atmosphere (e.g. stream, $CO_2$, etc.) at a temperature above 600° C., depending on the ultimate application of the electrode.

Carbon aerogels of various types and carbon aerogel microspheres for use in the fabrication of electrodes are now known. These prior carbon aerogel electrodes are exemplified by U.S. Pat. No. 5,260,855, issued Nov. 9, 1993 to J. L. Kaschmitter et al; and copending U.S. applications Ser. No. 08/036,740, filed Mar. 25, 1993, entitled "Carbon Foams For Energy Storage Devices", now U.S. Pat. No. 5,529,971 issued Jun. 25, 1996; Ser. No. 08/110,003, filed Aug. 23, 1993, entitled "Method For Making Thin Carbon Foam Electrodes; and Ser. No. 08/183,876 filed Jan. 21, 1994, entitled "Carbon Aerogel Electrodes For Direct Energy Conversion". In addition, methods have been recently developed for producing carbon aerogel microspheres and new types carbon aerogels, and such are exemplified by U.S. applications Ser. No. 08/089,119 filed Jul. 3, 1993, entitled "Organic Aerogel Microspheres And Fabrication Method Therefor", now U.S. Pat. No. 5,508,341 issued Apr. 16, 1996; Ser. No. 08/041,503 filed Apr. 1, 1993, entitled "Method Of Low Pressure And/Or Evaporated Drying Of Aerogel", now U.S. Pat. No. 5,420,168 issued May 30, 1995; and Ser. No. 08/307,219 filed Sep. 16, 1994, entitled "Organic Aerogels From The Sol-Gel Polymerization of Phenolic-Furfuryl Mixtures", now U.S. Pat. No. 5,476,878 issued Dec. 19, 1995. Also, the fabrication of doped carbon foams for various applications is now known, as exemplified by U.S. Pat. No. 5,358,802 issued Oct. 25, 1994 to S. T. Mayer et al. Each of the above-identified patents and copending applications are assigned to the assignee of this application. The carbon aerogel powders and/or carbon aerogel microspheres or powders for carrying out the present invention can be formed from any of the above-referenced carbon aerogels by grinding (such as by a mortar and pestle) the thus formed carbon aerogels and then sieving to the desired powder size (such as between 30–60 µm).

Solid porous carbon electrodes have been produced during experimental verification of the present invention by combining powders of various carbon blacks, examples of which include pyrolyzed cokes, powers derived from the pyrolysis of polyfurfuryl alcohol, polyacrylonitrile, carbon aerogels, carbon aerogel microspheres and powders thereof, and various graphite powders. For example, a mixture of powdered phenolic resin and furfuryl alcohol (a liquid) are combined with the percent phenolic by weight varying from 10%–100%, with the preferred being 33 wt % phenolic resin. Varying amounts of this mixture (referred to hereinafter as a binder precursor) are added to the selected carbon powder (varying from 5% to 50% by weight, with the preferred being 30%), and the resulting slurry can be formed to a desired shape factor (described below) and subsequently pyrolyzed in an inert atmosphere (e.g. argon, nitrogen, vacuum), a reducing atmosphere (e.g. hydrogen containing gas mixture), or oxidizing atmosphere (e.g. steam, $CO_2$) at a temperature above 600° C., depending on the ultimate application of the electrode. Inert atmospheres can be used to produce lower surface area materials, and reducing agents help to remove surface oxygen-containing species on the carbon. Oxidizing atmospheres result in activating the carbon (increasing surface area), and materials processed in this manner are useful in double layer capacitors, deionization, etc. Actual performance of the electrodes for a given use strongly depend on the formation of the binder, the weight percent of the binder, and the carbon or graphite powder used.

The production of films of solid porous electrodes of various thickness can be accomplished by spreading the slurry of binder precursor and ground aerogel or carbon powder onto a metallic substrate (roll coating, blading, etc.)

prior to pyrolysis. A slurry thickness of 0.1 mm to 1 mm has been tested. Another method to form a thin film electrode involves the use of carbon fiber cloth, felt, paper, and conductive substrates. (e.g. Lydall Corp. carbon paper or copper foil), and non-conductive substrates. The slurry can be spread into the pores of the fiber cloth, and the composite pyrolyzed. An expanded metal current collector (e.g. Ni, Cu, Stainless Steel) can be placed between two layers of slurry impregnated fiber cloth. After pyrolysis, the metal current collector is imbedded between the two sheets and gives excellent contact to the individual sheet on either side.

The slurry can be made more workable by varying the viscosity by adding a number of inert dilutants (e.g. water, acetone, alcohols, etc.) which are evaporated subsequently. Other binding precursors can be used. For example PAN, polyfurfuryl alcohol (PFA), and mesophase pitches, such as polyvinyl chloride (PVC), can be used in place of phenolic resin.

The following sets forth experimental verification of the present invention relative to the influence of a phosphorous additive on the ability of monolithic polyacrylonitrile-derived porous carbon foams to intercate lithium. The porous carbon foams to intercate lithium. The porous carbon electrodes were prepared as follows:

Example 1

Thin film electrodes containing SFG 6 graphite powders are fabricated in the following procedure. First, a binder solution was prepared by mixing phenolic resin No. 29-217 (a powder, Pacific Coast Chemicals) with Furfuryl Alcohol (QA Chemical) in a 1:2 weight ratio. Specifically, 50 grams of phenolic resin was added to 100 grams of furfuryl alcohol. The binder solution has a dark brown color. Graphite powder (SFG 6, Lonza, Inc.) was used directly as supplied by the manufacturer. A mixture of the graphite powders and the binder solution was then prepared. Two grams of SFG 6 powder were added to 1.32 grams of the liquid binder. A small amount of pure furfuryl alcohol (~1 g) is added while stirring to bring the mixture to a smooth blot non-pourable consistency.

A 8 cm×15 cm carbon fiber sheet (0.125 mm-thick, Lydall Corp.) is pre-wetted with furfuryl alcohol. (QA Chemicals Inc.) A lint free tissue is used to gently blot the excess of alcohol off the surface. The graphite powder/binder slurry is then spread onto the wetted carbon fiber between the parallel (0.15 mm-thick) Starret feeler gages (shim stock). The doctor blade is slowly drawn over the surface ensuring that all areas are covered with the SFG 6 slurry, producing a uniform sample thickness.

The impregnated carbon fiber composite is placed on a Ni foil and then placed in a Linberg inert atmospheric furnace (Model Blue M). The furnace is evacuated and filled with dry nitrogen repeatedly (two times). The pyrolysis condition included a two-hour hold at 180° C. followed a treatment at 1050° C. for three hours in a nitrogen atmosphere. The furnace was allowed to cool to room temperature before the thin films carbon electrodes were removed. The electrodes were tested as lithium intercalation anodes in lithium ion cells directly without further treatment.

The lithium intercalation performance data for electrodes containing SFG6 graphite powders are shown in Table 1. The electrolyte is 0.5M lithium trifluoromethanesulfonimide (LiN(CF$_3$SO$_2$)$_2$) in 50:50 ethylene carbonate/dimethyl carbonate solution. The reversible capacities observed with these electrodes approach 360 mAh/g, which is equivalent to 0.95 moles of lithium per six moles of carbons. The theoretical limit for lithium intercalation in graphite is LiC$_6$, or equivalent to 372 mAh/g. Comparisons of the performance of this type of electrode with those using different binders such as poly(tetrafluoroethylene), PTFE, or poly(vinylidene difluoride), PVDF, are given in Table 1. The procedures for preparing the latter electrodes were described in the above-mentioned reference T. D. Tran et al. (UCRL-JC-117265), "Carbonaceous Materials As Lithium Intercalation Anodes". The electrode containing the phenolic resin-derived carbon binder was found to have the highest capacity and the lowest first-cycle capacity loss. This type of electrode also shows excellent mechanical and chemical integrity in the electrolytes. The results with other graphite materials show large capacities that approach theoretically expected LiC$_6$ composition. Several examples of these types of electrodes containing other graphite powders and their performance data are further illustrated in reference UCRL-JC-117265. The potential profile of the SFG6 electrode as a function of Li intercalation capacity, x (Li$_x$C$_6$) is presented in FIG. 1. Both discharge (deintercalation) and charge (intercalation) curves are presented on the same x-axis for ease of observation and comparison. Lithium intercalation/deintercalation occurs at potential less than 0.25 V (vs. Li/Li$^+$). Three potential plateaus can be observed which are associated with the staging phenomena for intercalation. This type of performance voltage curve can be expected to give lithium ion cells with higher average cell voltage.

TABLE 1

Performance data for electrodes with different binders

| Type of carbon | Binder | Reversible capacity (mAh/g) | Irreversible capacity loss (mAh/g) |
|---|---|---|---|
| SFG6 | PTFE | 245 | 150 |
| SFG6 | PVDF | 295 | 102 |
| SFG6 | phenolic resin-based | 355 | 70 |
| Coke No. 1 | phenolic resin-based | 265 | 40 |

Example 2

Thin film electrodes containing petroleum coke No. 1 (Superior Graphite Co., USA) are prepared in the following procedures. First, a binder solution was prepared by mixing phenolic resin No. 29-217 (a powder, Pacific Coast Chemicals) with furfuryl alcohol (QA Chemical) in a 1:2 weight ratio. Specifically, 50 grams of phenolic resin was added to 100 grams of furfuryl alcohol. The granular petroleum cokes samples were ground using a mortar and pestle and then sieved to between 30 and 60 µm. A mixture of the fine coke powders and the binder solution was then prepared. Two grams of coke powders were added to 0.64 grams of the liquid binder. A small amount of pure furfuryl alcohol (~1 g) is added while stirring to bring the mixture to a smooth but non-pourable consistency.

A 8 cm×15 cm carbon fiber sheet (0.125 mm-thick, Lydall Corp.) is prewetted with furfuryl alcohol. (QA Chemicals Inc.) A lint free tissue is used to gently blot the excess alcohol off the surface. The graphite powder/binder slurry is then spread onto the wetted carbon fiber between the parallel (0.30 mm-thick) Starret feeler gages (shim stock). The doctor blade is slowly drawn over the surface ensuring that all areas are covered with the coke slurry, producing a uniform sample thickness.

The impregnated carbon fiber composite is placed on a Ni foil and then placed in a Linberg vacuum furnace (Model Blue M). The furnace is evacuated and filled with dry nitrogen repeatedly (two times). The pyrolsis condition included a two-hour hold at 180° C. followed a treatment at 1050° C. for three hours in a nitrogen atmosphere. The furnace was allowed to cool to room temperature before the thin films carbon electrodes were removed. The electrodes were tested directly without further treatment.

The performance data for electrodes containing Superior Graphite Coke No. 1 are included in Table 1. The electrolyte is 0.5M lithium trifluoromethanesulfonimide (LiN(CF$_3$SO$_2$)$_2$) in propylene carbonate solution. The reversible charge (deintercalation) capacities of these type of electrodes are about 265 mAh/g. The first-cycle irreversible capacity loss for these materials are 40 mAh/g. Several examples of electrodes containing other coke or carbon black powders are also given in reference UCRL-JC-117265.

Also, undoped and doped PAN-derived carbon anodes, show excellent cycle-life performance with coulombic efficiency close to 100%. A more detailed description of the fabrication and testing of the undoped and doped PAN-derived porous carbon electrodes is set forth in the above-referenced article "Laithium Intercalation in Porous Carbon Anodes".

The carbon powders may be produced from carbon aerogel foams and/or carbon aerogel microspheres, produced as described and claimed in the above-referenced copending applications and above-referenced U.S. Pat. Nos. 5,260,855 and 5,358,802. The carbon aerogels would be ground to a desired size powder, and utilized as described above. However, where the carbon powder was produced from a doped carbon aerogel (such as phosphorus doped porous carbon forms of UCRL-JC-119661, "Commercial Carbonaeons Materials As Lithium Intercalation Anodes (11)", dated January 1995),, the doping operation may be omitted or modified, depending on the desired end result and to amount of dopant in the carbon powder. The carbon aerogels produced by the above-referenced copending applications and patents have a variety of different densities, and thus the desired density of the carbon powder electrodes formed therefrom must take into account the density of the carbon aerogel powder.

It has thus been shown that the present invention provides for the formation of solid porous carbon electrodes from graphite and/or carbon powders for use in batteries, double layer capacitors, fuel cells, capacitive deionization, waste treatment, etc. The electrodes may be formed from various types of carbon containing powders and graphites, for the production of carbon electrodes having various densities and surface areas. The thus formed carbon electrodes may be undoped or doped. The actual performance of the carbon electrodes for a given use strongly depends on the formulation of the binder, the weight percent binder, and the carbon or graphite powders used.

While particular examples, procedures, materials, parameters, formulations, etc. have been described to enable an understanding of the invention, such are not intended to be limiting. Modifications and changes may become apparent to those skilled in the art, and the scope of the invention is limited only by the appended claims.

What is claimed is:

1. A process for fabricating carbon electrodes comprising:
   providing a carbon containing powder from materials selected from the group consisting of pyrolyzed polyfurfuryl alcohols, pyrolyzed polyacrylonitrile, pyrolyzed carbon aerogels, pyrolyzed carbon aerogel microspheres, and pyrolyzed carbon aerogel powder;
   providing a binder precursor from material selected from the group consisting of phenolic resin, polyacrylonitrile, polyfurfuryl alcohol, and mesophase pitches;
   forming a slurry composed of the carbon containing powder and the binder precursor;
   forming a film containing at least the thus formed slurry; and
   pyrolyzing the thus formed film.

2. The process of claim 1, additional including providing a dopant prior to pyrolyzing the thus formed film to produce doped carbon electrodes.

3. The process of claim 1, additionally including providing the slurry with an additive to change the viscosity thereof.

4. The process of claim 1, additionally including activating the thus formed carbon electrodes.

5. The process of claim 1, wherein the thus formed film is produced by depositing the slurry on a substrate.

6. The process of claim 1, wherein the thus formed film is produced by depositing the slurry on a porous material.

7. The process of claim 6, wherein the porous material is selected from the group consisting of carbon fiber cloth, carbon paper, felts, and conductive and non-conductive substrates.

8. The process of claim 1, wherein the thus formed film is produced by depositing the slurry on an electrically conductive material.

9. The process of claim 1, wherein the thus formed film is produced by spreading the slurry into porous of a porous material, and positioning the slurry containing material around a current collector, whereby after pyrolyzing the current collector is embedded between two sheets of the slurry impregnated porous material.

10. The process of claim 1, wherein said mesophase pitches are selected from the group consisting of polyvinyl chloride and polyvinylilene difluoride.

11. The process of claim 1, wherein pyrolyzing of the thus formed film in carried out in an atmosphere selected from the group of inert atmospheres, reducing atmospheres, and oxidizing atmospheres, and at a temperature above 600° C.

12. A solid carbon porous electrode produced by the process of claim 1.

13. A process for producing carbon electrodes, comprising:
    preparing a binder solution;
    providing a quantity of powder selected from the group of carbon aerogel foam powders, and carbon aerogel microspheres;
    preparing a mixture of the powder and the binder solution;
    adding a binder precursor to the mixture to bring the mixture to a smooth but non-pourable consistency;
    wetting a sheet of carbon fiber with a binder precursor;
    spreading the mixture on the wetted carbon fiber sheet to provide a composite of uniform thickness; and
    pyrolyzing the thus formed composite.

14. The process of claim 13, additionally including providing the mixture with a dopant.

* * * * *